United States Patent [19]

Camps et al.

[11] Patent Number: 4,768,090
[45] Date of Patent: Aug. 30, 1988

[54] SURVEILLANCE DEVICE USING VIDEO CAMERA

[75] Inventors: Robert Camps, Paris; Saïd Moudir, Geneve, both of France

[73] Assignee: Compagnie Generale D'Automatisme CGA-HBS, Paris, France

[21] Appl. No.: 93,672

[22] Filed: Sep. 8, 1987

[30] Foreign Application Priority Data

Sep. 8, 1986 [FR] France .................................. 86 12729

[51] Int. Cl.⁴ ........................ H04N 7/18; G08B 13/00; G08B 15/00
[52] U.S. Cl. .................................... 358/108; 358/210; 358/229; 406/34; 406/191
[58] Field of Search .................... 358/108, 210, 229; 406/34, 163, 191, 198

[56] References Cited

U.S. PATENT DOCUMENTS 3,758,050  9/1973  Watts ..................................... 406/34
4,337,482  6/1982  Coutta ................................. 358/108
4,455,112  6/1984  Anders ............................... 406/191

FOREIGN PATENT DOCUMENTS 589991  7/1977  Switzerland ...................... 358/108

*Primary Examiner*—Howard W. Britton
*Attorney, Agent, or Firm*—Sughrue, Mion, Zinn, Macpeak, and Seas

[57] ABSTRACT

The surveillance device uses a surveillance unit such as a video camera, the signals from which are received by a detection unit, the device being mounted on a mobile chassis driven by propulsion means inside a tube equipped with a longitudinal window through which passes the the transverse axis of sight of the surveillance unit, wherein the window is covered by a longitudinal elastic flap one side of which is attached to the tube, the other side remaining free, shaped elements attached to the chassis raising the longitudinal flap on either side of the axis of sight and beyond this axis. This device can be used for surveillance over long distances.

4 Claims, 1 Drawing Sheet

SURVEILLANCE DEVICE USING VIDEO CAMERA

BACKGROUND OF THE INVENTION

1. Field of the Invention

The invention relates to a surveillance device using a surveillance unit such as a video camera, the signals from which are received by a detection unit, the device being mounted on a mobile chassis driven by propulsion means inside a tube equipped with a longitudinal window through which passes the transverse axis of sight of the surveillance unit.

2. Description of the Prior Art

Such devices have proved particularly effective for the surveillance of large areas such as public places, stores, conference rooms or similar areas and even large parts of networks for example freeway systems.

The tube in which the surveillance unit moves can be extremely long, up to several miles if the propulsion means are appropriately designed.

However, it has proved in use that the longitudinal window through which the axis of sight passes can offer a number of disadvantages. It allows dirt and foreign bodies to penetrate necessitating costly maintenance and even risking causing breakdowns and failures. Moreover, the window must be closed if the propulsion means is a gas under high or low pressure.

A solution consisting in providing the window with a transparent glazed surface has been proposed and successfully tried but it is relatively expensive to produce and necessitates automatic glass cleaning means.

SUMMARY OF THE INVENTION

The object of the invention is to remedy these disadvantages and to do so the surveillance device according to the invention comprises a window covered with a longitudinal elastic flap one edge of which is attached to the tube and the other edge of which is free, and shaped elements secured to the chassis lifting the longitudinal flap on either side of the axis of sight and beyond this axis.

It will be realized that such a flap protects the inside of the tube from the penetration of all foreign bodies without needing the slightest maintenance. Through being raised on either side of the axis of sight, it also provides for direct passage which improves the clarity of the signals received as well as for example direct vision if the surveillance unit is a camera. Finally, it enables all propulsion means to be used including fluids and in particular low pressure air.

In a preferred embodiment, the shaped elements, the spacing of which is adjustable, comprise an outer edge and at least one inclined plane extending beyond the axis of sight of the side of the flap attached to the tube.

This arrangement provides gradual lifting of the flap irrespective of the direction in which the mobile chassis is moving and avoids damaging the flap even at high speed.

In accordance with an enhancement falling within the scope of the invention, the shaped elements support auxiliary units communicating with the detection unit such as a sound transmitter and receiver.

These shaped elements can effectively be used as a support for any objects which may be useful to surveillance or communication between the detection unit and the area under surveillance since they are permanently outside the tube.

One embodiment of the invention will now be described as a non-limiting example with reference to the attached drawing.

DESCRIPTION OF THE PREFERRED EMBODIMENT

Figure 1:
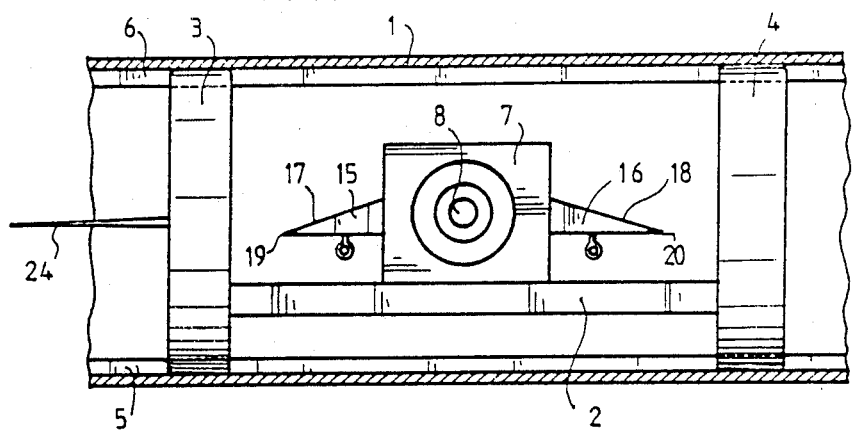
FIG. 1 is a view in partial longitudinal cross-section showing a sector of a surveillance device according to the invention.

The surveillance device shown comprises a cylindrical tube 1 the length of which corresponds to the area to be placed under surveillance and can range from a few yards to several hundred yards or even several miles.

In this tube is placed a chassis 2 here consisting of a simple horizontal plate supported by two end disks 3 and 4 the diameter of which corresponds to the inner diameter of the cylindrical tube 1.

Two trapezoidal section guides 5 and 6 are disposed along two opposite generatrices inside the cylindrical tube 1. They collaborate with two recesses of corresponding section provided in each disk to enable the chassis to move without rotating. They can also be used conventionally to provide the electrical supply to the apparatus carried by the chassis through contacts and rails suitably arranged in the disks and on the guides.

On the chassis 2 is mounted a video camera 7 with a transverse viewfinder 8, the optical axis of which is approximately in the horizontal plane of symmetry of the assembly.

Figure 2:
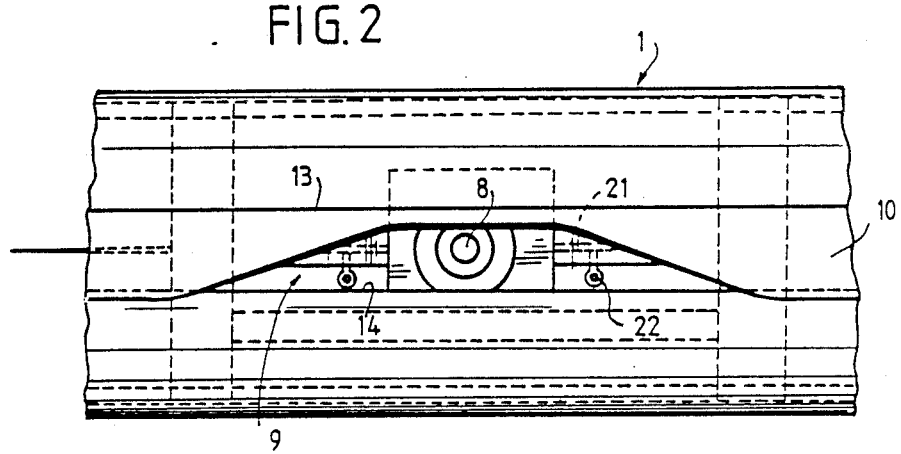
FIG. 2 is a side view of the same sector.
Figure 3:
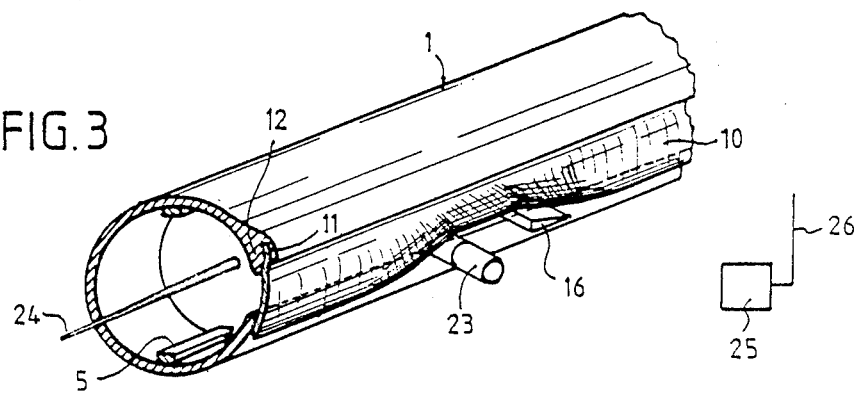
FIG. 3 is a view in perspective of the same sector but at reduced scale.

As can be seen better in FIGS. 2 and 3, the cylindrical tube 1 is provided with a longitudinal aperture 9 forming a continuous window for the passage of the light rays which must reach the viewfinder 8 of the camera 7.

In front of this window 9 is mounted a flap 10 made of a flexible, elastic material such as natural or synthetic rubber or a suitable plastics material. The flap 10 is mounted by means of a lip 11 which it has on its upper part, said lip being held by a jaw 12 situated along the upper edge 13 of the window 9. As can be seen clearly from FIGS. 2 and 3 of the drawing, the flap 10 in the rest position slightly overlaps the lower edge 14 of this window.

On either side of the camera 7 are mounted two shaped elements 15 and 16 of essentially triangular section each comprising an inclined plane 17, 18 which extends from the camera to a terminal edge 19, 20. These shaped elements extend outside the cylindrical tube 1 through the window 9 so as to raise the elastic flap 10 so that the part between the two inclined planes 17 and 18 clears the optical axis of the viewfinder 8 of the camera 7.

It will be noted that the mounting of the shaped elements 15 and 16 on the camera 7 may be made adjustable by threading them for example on rods such as 21 and interposing a locking means 22.

FIG. 3 shows a microphone 23 mounted outside the cylindrical tube 1 at the end of the shaped element 15. This figure also shows schematically a transceiver antenna 24 capable of receiving and transmitting signals for the video camera 7 and the microphone 23 in cooperation with a detection unit 25 itself also equipped with a transceiving antenna 26.

The device described works in the following manner.

The mobile assembly consisting of disks 3 and 4, the chassis 2 and the instruments which it carries is set in motion in the example shown by a low pressure created to the left or the right, said low pressure being obtained in spite of the window 19 since the flap 10 presses against this window 9 up to the disks 3 and 4 and is only detached from between these disks in the area between the edges 19 and 20 of the shaped elements 15 and 16.

It will also be noted that the movement of the mobile assembly can be effected by other means including a stepper motor mounted on the assembly itself, linked to one or more drive wheels.

During movement of the chassis, the shaped elements 15 or 16 control the raising of the flap 10, enabling the video camera 7 to operate without any more or less transparent obstacle. The shape of the shaped elements avoids all wear on the flap.

If the chassis is halted, either automatically or manually, at a given place or an incident is signalled by the video camera the microphone 23 enables a conversation to take place between the persons present at the site of the incident and the personnel at the detection unit 25.

Finally it will be noted that the flap 10 avoids all need for maintenance and all accidental or deliberate damage since except in the area of the video camera 7 it isolates the entire interior of the cylindrical tube 1 over its entire length.

It will be understood that various changes in the details, materials and arrangements of parts, which have been herein described and illustrated in order to explain the nature of the invention, may be made by those skilled in the art within the principle and scope of the invention as expressed in the appended claims.

There is claimed:

1. Surveillance device using a surveillance unit such as a video camera, the signals from which are received by a detection unit, mounted on a mobile chassis driven by propulsion means inside a cylindrical tube equipped with a longitudinal window through which passes the transverse axis of sight of the surveillance unit, wherein the window is covered by a longitudinal elastic flap one side of which is attached to the cylindrical tube, the other side remaining free, shaped elements attached to the chassis raising the longitudinal flap on either side of the axis of sight and beyond this axis.

2. Surveillance device according to claim 1, wherein the spacing of the shaped elements can be adjusted.

3. Surveillance device according to claim 1, wherein the shaped elements have an outer edge and at least one inclined plane extending beyond the axis of sight of the edge of the side of the flap attached to the tube.

4. Surveillance device according to claim 1, wherein the shaped elements have auxiliary units communicating with the detection unit such as a sound transmitter and receiver.

* * * * *